United States Patent [19]

Diamantis

[11] Patent Number: 5,237,607
[45] Date of Patent: Aug. 17, 1993

[54] LIGHTED TELEPHONE DIAL

[75] Inventor: Perry W. Diamantis, East Brunswick, N.J.

[73] Assignee: AT&T Bell Laboratories, Murray Hill, N.J.

[21] Appl. No.: 817,006

[22] Filed: Jan. 3, 1992

[51] Int. Cl.[5] ............................................ H04M 1/27
[52] U.S. Cl. .................... 379/419; 379/387; 379/368; 379/433; 362/88
[58] Field of Search ............... 379/355, 368, 428, 433, 379/396, 387; 362/88

[56] References Cited

U.S. PATENT DOCUMENTS 4,866,764  9/1989  Barker, III .................... 379/355

Primary Examiner—Curtis Kuntz
Assistant Examiner—M. W. Shehata
Attorney, Agent, or Firm—Samuel R. Williamson

[57] ABSTRACT

A dial illuminating assembly allows for minimum power operation while maintaining uniformity of illumination in a telephone dial. The dial illumination assembly includes a plurality of fiber optic light guides for receiving light rays emanating from a light source and for directing these light rays to a plurality of translucent buttons. Illumination of the translucent buttons is achieved by creating multiple abraded surfaces on the light guides for dispersing the light rays in the vicinity of each translucent button. The light guides are routed along opposed sides of the translucent buttons with abraded surfaces on the light guides being positioned next to each button for providing the desired illumination. The dial illuminating assembly directs light rays so efficiently that only one light source is needed to provide uniform illumination in standard telephone dials.

16 Claims, 4 Drawing Sheets

LIGHTED TELEPHONE DIAL

BACKGROUND OF THE INVENTION

1. Technical Field

This invention relates to the illumination of a telephone dial, and more particularly, to the illumination of such dial through use of fiber optic light guides.

2. Description of the Prior Art

Incandescent lights have been the primary source for illuminating telephone dials for dialing in low light or darkened conditions for a number of years. These lights require commercial power which is first stepped down by a line transformer and then distributed to each telephone set at a premises over an additional wire pair often available in standard telephone wiring. Such additional wires are not now available in many premises and the line transformer is both inconvenient and costly. Thus in recent years light-emitting diodes (LEDs) considered to be more desirable for illuminating telephone dials have been replacing the incandescent lights. These LEDs are powered by the current provided over the telephone line to the telephone set from a switching station such as a central office.

One of the perceptions of product quality in a telephone set is the uniformity of illumination across the face of the telephone dial if illumination for the dial is provided. In order to maintain this uniform illumination, a number of LEDs are typically employed, because most telephone sets receive their operating power from the switching station, which may be some distance away from the set, the available power is often limited.

A telephone dial employing LEDs is disclosed in U.S. Pat. No. 4,349,705. In this patent, a push-button dial assembly comprises a plurality of layers in a sandwich form. One of the layers is a planar plate made from a transparent plastic material. The plate includes four cylindrical recesses, each receiving a LED. The LEDs are energized when the telephone set is in its off hook (active) state and light travels through the light guide plate to translucent pushbuttons located on the keypad of the telephone set. Although this technique provides generally good results, the limited available power cannot be used exclusively by the LEDs, but rather must be shared with electrical circuits used for communications in the telephone set.

With the advent of improved cordless telephone sets in recent years, high quality wireless communications have come to be expected by the average consumer. Included in that high quality is convenience and ease of operation of these cordless telephone sets, including dial illumination inasmuch as the handset unit of these telephone sets is portable and may be easily transported to areas having low light or darkened conditions. A limitation on the illumination of the dial of a cordless telephone set not present in a corded telephone set is that the handset unit of the cordless telephone set requires a battery for providing operating power while it is operated remote from an associated base unit. Thus power for operating the handset unit is not only limited like that for the corded telephone set, but also exhaustible.

To insure the longest possible period of operation for a handset unit before having to return this unit to its associated base unit where it is normally recharged, many techniques have been devised for minimizing the current drain on the handset unit's battery. One such technique is to turn the handset unit completely off until or unless an incoming call is expected. Another technique, disclosed in U.S. Pat. No. 4,731,814 issued on Mar. 15, 1988 to W. R. Becker et al., reduces current drain by reducing the on-time state of most of the electronics in the handset unit when this unit is operated in a standby state, i.e., awaiting receipt of a call or other user initiated action. Thus in a cordless telephone handset unit, it is desirable to provide illumination for a telephone dial with minimum power in order to maintain the longest possible period of operation between battery recharges. While achieving this minimum power operation, it is also desirable that uniformity of illumination across the face of the telephone dial be maintained and/or improved.

SUMMARY OF THE INVENTION

A dial illumination assembly includes a plurality of fiber optic light guides for receiving light rays emanating from a light source and for directing these light rays to a plurality of translucent buttons. In accordance with the invention, illumination of the translucent buttons is achieved by creating multiple abraded surfaces on the light guides for dispensing the light rays in the vicinity of each translucent button. The light guides are routed along opposed sides of the translucent buttons with abraded surfaces on the light guides being positioned next to each button for providing the desired illumination.

In an illustrative embodiment of the invention, the size of each abraded surface on a light guide is determined according to the location of the abraded surface relative to the light source. By this sizing of the abraded surfaces, uniformity of illumination for the translucent buttons is maintained. For achieving this uniformity, the abraded surface located the closest to the light source on a light guide is created with the smallest surface area and an abraded surface located the furthest from the light source on the light guide is created with the largest surface area. The intermediate abraded surfaces also are created with proportionally abraded surface areas determined according to their respective locations relative to the light source. The present invention directs light so efficiently that only one light source is needed to provide uniform illumination in standard telephone dials.

BRIEF DESCRIPTION OF THE DRAWING

This invention and its mode of operation will be more clearly understood from the following detailed description when read with the appended drawing in which.

Throughout the drawings, the same element when shown in more than one figure is designated by the same reference numeral.

DETAILED DESCRIPTION

Figure 1:
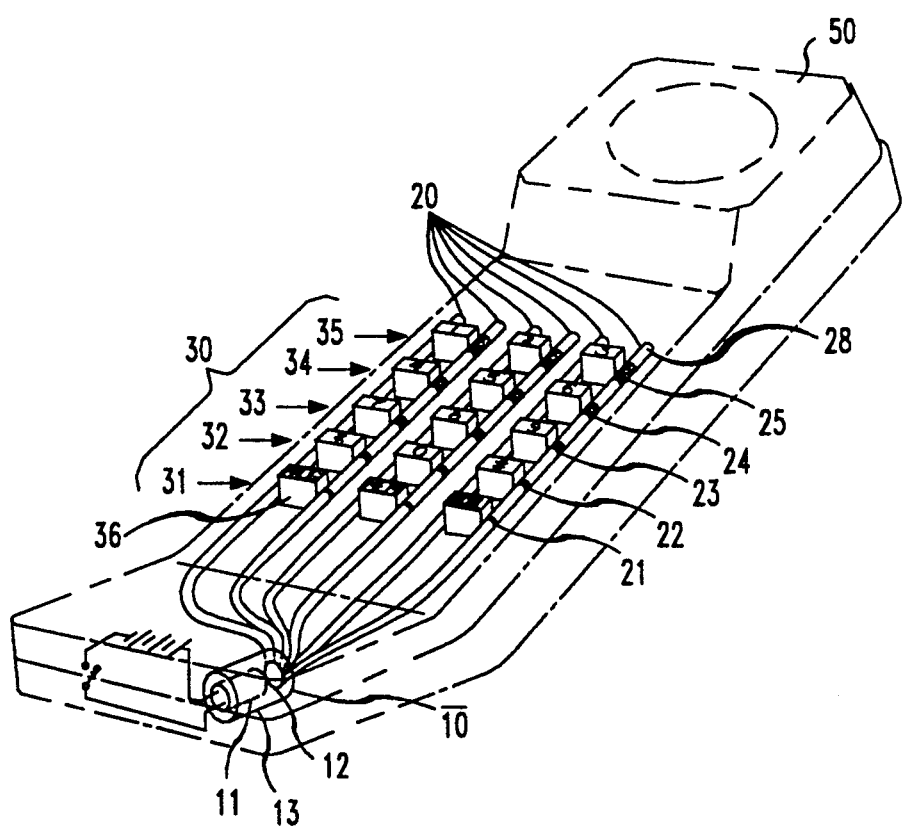
FIG. 1 is a perspective view of a telephone dial illumination assembly in accordance with the invention.

Referring now to FIG. 1, there is shown a perspective view of a dial illumination assembly comprising a light source 10, light guides or fiber optic strands 20 having multiple abraded sections 21 through 25 and a keypad array 30 having rows 31 through 35 of translucent buttons 36. The dial illumination assembly is illustratively shown mounted in a housing 50 for a cordless telephone handset, such housing being shown in phantom by dotted lines. Although a keypad array of translucent buttons is described, it is to be understood that the keypad array could be in other forms and comprised of other materials. For example, a keypad array comprised of liquid crystal devices (LCDs) is operative with the light guides described herein in accordance with the principles of this invention and such operation is anticipated.

Figure 2:
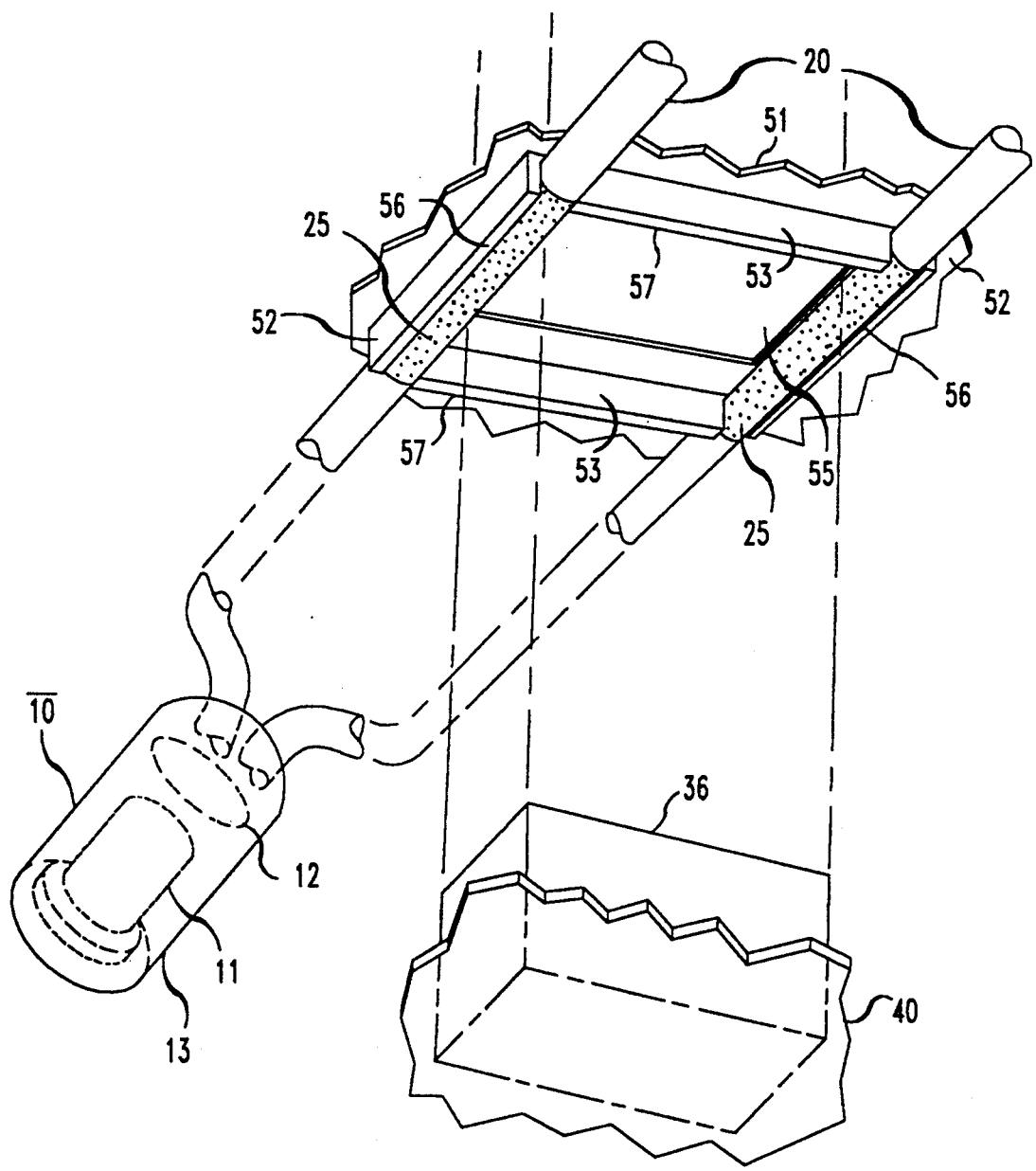
FIG. 2 is an exploded perspective view of a section of the telephone dial illumination assembly of FIG. 1, in accordance with the invention.

The light source 10 comprises a LED 11, a lens 12, shown more clearly in FIG. 2, and a ferrule 13 for securing the ends of the multiple fiber optic strands 20 in the light source 10. The lens 12 increases the efficiency of the light source by focusing the light emitted by the LED onto the ends of the optic strands 20. Although only a single LED is used as the light source 10, it is to be understood that multiple LEDs having low current consumption also may be employed in accordance with the principles of this invention and such operation is anticipated. LEDs suitable for use as LED 11 are readily available. Such an LED is available, for example, from Hewlett Packard as model HLMP-3850.

In the illustrated embodiment of FIG. 1, six fiber optic strands 20 are employed in illuminating the keypad array 30. In accordance with the invention, each one of the translucent buttons 36 in the keypad array 30 has one of the fiber optic strands 20 positioned along each of its two sides in close proximity for providing the desired illumination. The strands 20 are approximately one millimeter in diameter, are comprised of a polymethyl methacrylate (PMMA) core material with an outer coating material having a low refractive index, and are available from Mitsubishi Corporation. Each one of the strands 20 is nested in a channel in the housing of the handset 50, as shown in FIG. 2 and described in detail later herein.

For providing the desired illumination to the translucent buttons, each portion of the fiber optic strands 20 that is to be placed in the vicinity of each of the buttons 36 is first abraded. These abrasions to the strands 20 are easily created by an abrasive rotating device (not shown) which is brought in contact with and roughens desired circumferential surface areas of each strand. Light rays from the light source 10 are scattered or dispersed from the strands 20 at these abrasions, with most of the dispersed light rays impinging on and thereby illuminating the translucent buttons 36.

The abrading of the outer coating material on the fiber optic strands 20 prevents total internal reflection of the light rays propagating past these abraded sections. When the outer coating material with its lower refractive index is intact, as in the non-abraded sections, the critical angle of reflection is lowered and the internal reflection increased. Snell's law, $n \sin \phi = n' \sin \phi'$, is applicable for these nonabraded sections of the fiber optic strands 20 which provide total internal reflection of the light rays propagating through these sections. But when the localized surface abrasions on the strands 20 destroys this outer coating material, the light rays escape at these abraded sections.

Uniform illumination of the translucent buttons is assured, in accordance with the invention. The abrasions, comprising abraded sections 21, 22, 23, 24 and 25, are formed on the strands 20 such that the surface areas for these abrasions are made progressively longer in length for reflecting each abrasion's increased distance from the light source 10. In that the light is more intense at the abrasions nearest to the light source, these abrasions are necessarily formed with the smallest abraded surface area to limit the amount of light rays escaping the strands at these locations. This increasing length in the abraded surface areas is proportioned such that abraded section 21 is formed with the smallest abraded surface area and abraded section 25 is formed with the largest abraded surface area. And abraded section 22 through 24 are sized and proportioned with respect to abraded sections 21 and 25 in numerically increasing order such that, for example, abraded section 22 has a greater abraded surface area than abraded section 21 and abraded section 24 has a smaller abraded surface area than abraded section 25.

In accordance with the conventional spacing of the buttons on the keypad array 30, an optimum ratio in the length of the abraded surface areas for achieving uniform illumination over the dial is such that the length of the abraded section 21 is made approximately 0.050 inches and the length of the abraded section 25 is made approximately 0.150 inches. The length of adjacent abraded sections differ by 0.025 inches. This varying of the abraded sections in the strands 20 advantageously provides an even gradient of light across the keypad array 30. The end of each optic strand 20 is cut such that its surface 28 appears perpendicular to the length of the strand. To reflect the light rays reaching this surface back into the optic strand 20 toward the light source 10, this end surface 28 is electroplated or coated with a reflective paint or other reflective material.

With reference to FIG. 2, there is shown an exploded perspective view of certain portions of the dial illumination assembly. Specifically, one of the translucent buttons 36 is shown affixed to a flexible securing portion 40 which has all of the translucent buttons of the keypad array 30, shown in FIG. 1, affixed thereto in the same manner. Also shown are the LED 11, the lens 12, and the ferrule 13 which collectively comprise the light source 10.

Also shown in this figure are a portion of the top 51 of the telephone handset housing 50 and a pair of the fiber optic strands 20 mounted in channels formed by shoulder portions 52 and spacing members 53 affixed to the top 51. An aperture or opening 55 in the top 51 is provided for each one of the translucent buttons 36 to pass through when the flexible securing portion 40 of the keypad array 30 is brought into engagement with the lower edge 56 of the shoulder portions 52 and the lower edge 57 of the spacing members 53.

Shown in particular detail are the abraded sections, for example sections 25, of the fiber optic strands 20. When in an assembled position, these strands 20 are disposed on opposite sides and located in close proximity to a translucent button 36. The light rays escaping from these abraded sections are absorbed into translucent button 36 for providing a glow which illuminates the numbers and/or letters, shown in FIG. 1, formed on its upper surface. For increasing the amount of reflected light entering the translucent button 36, both the channels formed by shoulder portions 52 and spacing members 53 and also the upper surface of the flexible securing portion 40 are coated with a reflective type paint or other reflective material.

Figure 3:
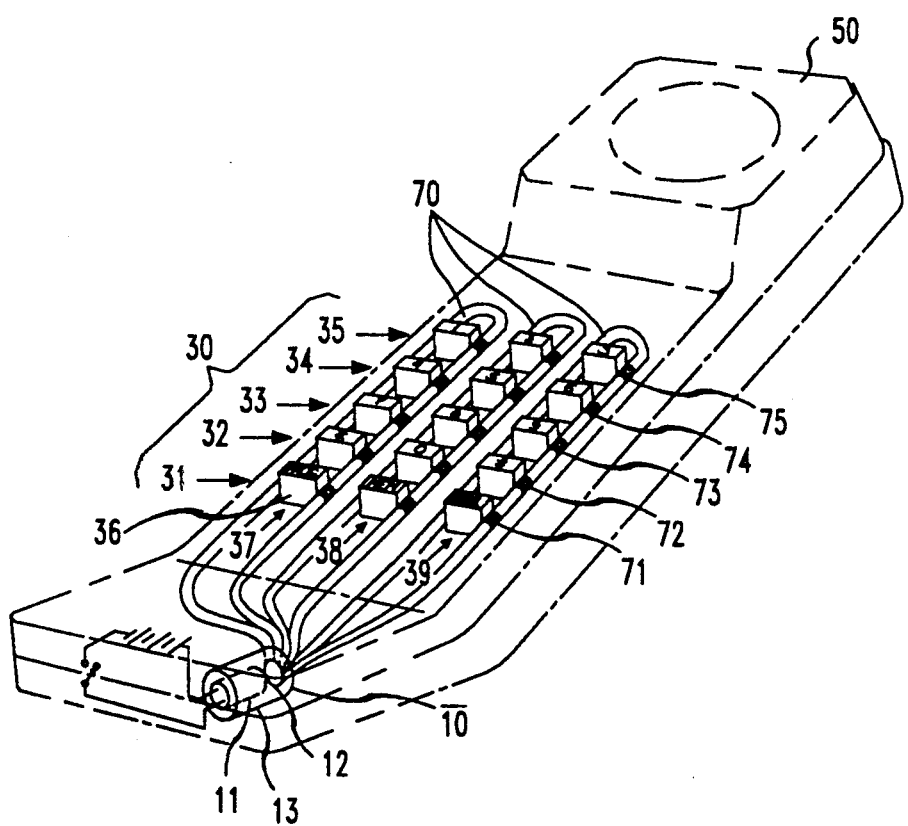
FIG. 3 is a perspective view of an alternative telephone dial illumination assembly in accordance with the invention.

Obviously, many modifications and variations of the present invention are possible in light of the above teachings. By way of example, an alternative embodiment operable in view of the above teaching is set forth in FIG. 3. Shown in this figure is a telephone dial illuminating assembly which employs, for example, three fiber optic strands 70 for illuminating a keypad array 30 comprising translucent buttons. This dial illuminating assembly is similar in structure to the assembly shown in FIG. 1. The structural similarities are therefore not further described. The principal difference in the two assemblies is that the fiber optic strands 70, shown in the assembly of FIG. 3, are arranged in a loop extending from and returning to the light source 10. In providing this loop, each one of the strands 70 extends from the light source along the side of one of three columns 37, 38 and 39 of translucent buttons in the keypad array and out of the keypad array. The strands 70 then loop back into the keypad array along the opposite side of the translucent buttons such that illumination for each translucent button in a column of the keypad array is provided by a single fiber optic strand loop. Unlike the assembly shown in FIG. 1, uniform illumination of the translucent buttons is achieved simply by constructing all the abraded sections 71 through 75 on strands 70 both in rows 31 through 35 and columns 37 through 39 to be equal in length.

Figure 4:
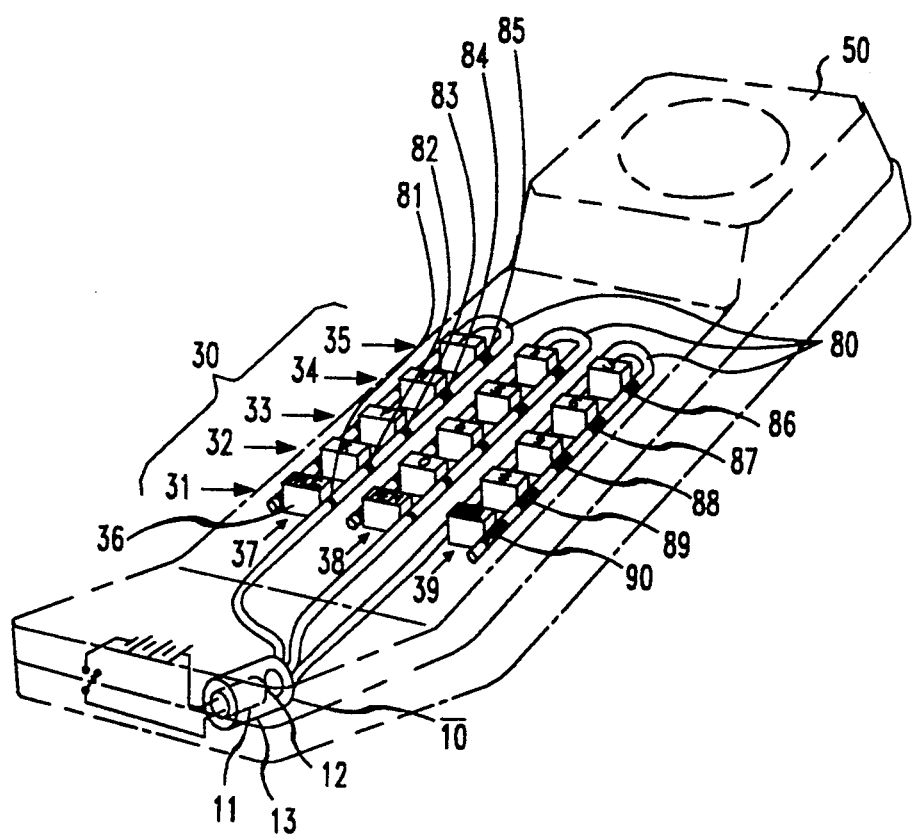
FIG. 4 is a perspective view of a second alternative telephone dial illumination assembly in accordance with the invention.

Yet another alternative embodiment operable in accordance with the invention is shown in FIG. 4. As shown in FIG. 4, a telephone dial illuminating assembly employs, for example, three fiber optic strands 80 for illuminating a keypad array 30 containing translucent buttons. This dial illuminating assembly is similar in structure to the assemblies shown in both FIGS. 1 and 3. The principal difference in this assembly is that the fiber optic strands 80 are arranged to extend into the keypad array 30 along the side of a column 37, 38 or 39 of translucent buttons, loop around and then extend into the keypad array along the opposed side of the column of translucent buttons such that illumination for each translucent button in a column of buttons in the keypad array is provided by a single fiber optic strand. After the fiber optic strand passes along the opposed side of the first translucent button encountered when first entering the keypad array, this strand is terminated and this terminating surface coated with some type of reflective material. The light uniformity over the dial is maintained by proportioned abraded sections 81 through 90 of the fiber optic strands 80 such that the smallest abraded section 81 in each fiber optic strand in the one located the closest to the light source and the largest abraded section 90 in each fiber optic strand is the one located the furthest from the light source.

Other modifications and variations of the present invention also are possible in light of the above teachings. It is therefore to be understood that within the scope of the appended claims, the invention may be practiced otherwise than as specifically described.

I claim:

1. An assembly for illuminating a plurality of buttons on a telephone dial, the assembly comprising:
   light guide means for receiving light rays emanating from a light source and for directing said light rays from the light source to the plurality of buttons; and
   light dispersion means for dispersing the light rays in the vicinity of the plurality of buttons for illuminating said plurality of buttons, the light dispersion means comprising abraded sections on the light guide means, each abraded section on the light guide means being sized according to its location relative to the light source, the abraded section located the closest to the light source having the smallest abraded surface area and the abraded section located the furthest from the light source having the largest abraded surface area.

2. The assembly of claim 1 wherein the light guide means comprises a fiber optic strand.

3. The assembly of claim 2 wherein each abraded section comprises a roughened circumferential abraded surface area on the fiber optic strand.

4. The assembly of claim 1 wherein the light source is a light emitting diode.

5. The assembly of claim 4 further comprising a lens for focusing the light rays emanating from the light emitting diode.

6. The assembly of claim 1 wherein the light guide means comprises a plurality of fiber optic strands extending from the light source, each one of the plurality of buttons having one of said plurality of fiber optic strands disposed on opposite sides of said button and positioned in close proximity thereto for providing illumination for said button from an abraded section on each strand.

7. The assembly of claim 1 wherein the light guide means comprises a plurality of fiber optic strands extending from the light source, each one of the plurality of buttons having a first portion of one of said plurality of fiber optic strands disposed on a first side of said button in close proximity thereto and an extended second portion of the fiber optic strand disposed on a second side of said button in close proximity thereto, the first and second portion of the fiber optical strand providing illumination for said button from abraded sections located on said strand.

8. A telephone dial assembly comprising:
   a light source;
   a plurality of translucent buttons;
   light guide means for receiving light rays emanating from the light source and for directing said light rays from the light source to the plurality of translucent buttons; and
   light dispersion means for dispersing the light rays in the vicinity of the plurality of translucent buttons for illuminating said buttons, the light dispersion means comprising abraded sections on the light guide means, each abraded section on the light guide means being sized according to its location relative to the light source, the abraded section located the closest to the light source having the smallest abraded surface area and the abraded section located the furthest from the light source having the largest abraded surface area.

9. The telephone dial assembly of claim 8 wherein the light source is a single light emitting diode.

10. The telephone dial assembly of claim 8 wherein the light guide means comprises a plurality of fiber optic strands.

11. The telephone dial assembly of claim 10 wherein each abraded section comprises a roughened circumferential abraded surface area on the fiber optic strands.

12. The telephone dial assembly of claim 11 further comprising a pair of channels formed on opposite sides of an opening in a telephone housing, the opening providing a passageway for one of the plurality of translucent buttons and the pair of channels providing a positioning means for guiding fiber optic strands in close proximity to said one of the plurality of translucent buttons.

13. The telephone dial assembly of claim 12 wherein the abraded sections of the fiber optic strands are positioned in the pair of channels for illuminating said one of the plurality of buttons.

14. The telephone dial assembly of claim 13 wherein each one of the pair of channels is coated with a reflective type material.

15. An assembly for illuminating a plurality of buttons on a telephone dial, the assembly comprising:

light guide means for receiving light rays emanating from a light source and for directing said light rays from the light source to the plurality of buttons, the light guide means comprising fiber optic strand loops, each of the strand loops having both ends connected to the light source; and light dispersion means for dispersing the light rays in the vicinity of the plurality of buttons, the light dispersion means comprising abraded sections on the light guide means for illuminating said plurality of buttons, each one of the plurality of buttons having the strand from a strand loop disposed on opposite sides of said button and positioned in close proximity thereto for providing the illumination for said button from the abraded sections on said strand loop.

16. The assembly of claim 15 wherein each of the abraded sections on the fiber optic strand loop has the same size abraded surface area.

* * * * *